US009313745B2

(12) United States Patent
Pi et al.

(10) Patent No.: US 9,313,745 B2
(45) Date of Patent: Apr. 12, 2016

(54) APPARATUS AND AN ASSOCIATED METHOD FOR FACILITATING COMMUNICATIONS IN A RADIO COMMUNICATION SYSTEM THAT PROVIDES FOR DATA COMMUNICATIONS AT MULTIPLE DATA RATES

(71) Applicant: Nokia Corporation, Espoo (FI)

(72) Inventors: Zhouyue Pi, San Diego, CA (US); Zhigang Rong, San Diego, CA (US)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/520,836

(22) Filed: Oct. 22, 2014

(65) Prior Publication Data

US 2015/0078234 A1    Mar. 19, 2015

Related U.S. Application Data

(60) Division of application No. 13/357,209, filed on Jan. 24, 2012, now Pat. No. 8,917,653, which is a continuation of application No. 12/646,465, filed on Dec. 23, 2009, now Pat. No. 8,130,695, which is a continuation of application No. 10/512,850, filed as application No. PCT/US03/17625 on Jun. 5, 2003, now Pat. No. 7,660,277.

(60) Provisional application No. 60/386,819, filed on Jun. 7, 2002, provisional application No. 60/386,906, filed on Jun. 7, 2002.

(51) Int. Cl.

| H04W 52/16 | (2009.01) |
|---|---|
| H04W 36/16 | (2009.01) |
| H04W 52/26 | (2009.01) |
| H04W 52/02 | (2009.01) |
| H04W 52/12 | (2009.01) |
| H04W 28/22 | (2009.01) |

(52) U.S. Cl.
CPC .............. *H04W 52/16* (2013.01); *H04W 36/16* (2013.01); *H04W 52/0216* (2013.01); *H04W 52/0229* (2013.01); *H04W 52/12* (2013.01); *H04W 52/26* (2013.01); *H04W 52/267* (2013.01); *H04W 28/22* (2013.01); *Y02B 60/50* (2013.01)

(58) Field of Classification Search
None
See application file for complete search history.

(56) References Cited

U.S. PATENT DOCUMENTS

| 6,278,688 B1 | 8/2001 | Suutari et al. |
|---|---|---|
| 6,498,785 B1 | 12/2002 | Derryberry et al. |

(Continued)

FOREIGN PATENT DOCUMENTS

| EP | 977371 A2 | 2/2000 |
|---|---|---|
| EP | 1067704 A2 | 1/2001 |

(Continued)

OTHER PUBLICATIONS

European Search Report for EP Application No. 03731552 dated Jul. 25, 2005.

(Continued)

*Primary Examiner* — Donald Mills
(74) *Attorney, Agent, or Firm* — Banner & Witcoff, Ltd.

(57) ABSTRACT

Apparatus, and an associated method, for facilitating operation of a radio communication system that provides for multi rate data communications, such as a CDMA 2000 system that provides for 1xEV-DV communication services. A supplemental pilot, or control, signal generator embodied at a mobile station generates a supplemental pilot, or control, signal that is sent on a newly defined supplemental pilot, or control, channel. As the data rates of data communicated upon a reverse supplemental channel changes, corresponding changes are made to the power level of the reverse supplemental pilot, or control, signal.

18 Claims, 5 Drawing Sheets

(56) References Cited

U.S. PATENT DOCUMENTS

| | | |
|---|---|---|
| 6,567,391 B1 | 5/2003 | Moon |
| 6,597,705 B1 | 7/2003 | Rezaiifar et al. |
| 6,621,804 B1 | 9/2003 | Holtzman et al. |
| 6,631,123 B1 | 10/2003 | Jiang et al. |
| 6,850,506 B1 | 2/2005 | Holtzman et al. |
| 6,963,754 B2 * | 11/2005 | Masuda et al. ............... 455/522 |
| 7,031,742 B2 * | 4/2006 | Chen et al. ................... 455/522 |
| 7,254,121 B2 | 8/2007 | Kim et al. |
| 7,283,482 B2 | 10/2007 | Koo et al. |
| 7,480,270 B2 | 1/2009 | Achour et al. |
| 7,660,277 B2 | 2/2010 | Pi et al. |
| 7,929,481 B2 | 4/2011 | Lundby et al. |
| 8,068,453 B2 | 11/2011 | Holtzman et al. |
| 8,130,695 B2 | 3/2012 | Pi et al. |
| 2001/0046878 A1 | 11/2001 | Chang |
| 2002/0064145 A1 | 5/2002 | Khare et al. |
| 2002/0154610 A1 | 10/2002 | Tiedemann et al. |
| 2002/0198014 A1 | 12/2002 | Miyamoto et al. |
| 2003/0002461 A1 * | 1/2003 | Chaponniere et al. ........ 370/335 |
| 2003/0050084 A1 | 3/2003 | Damnjanovic et al. |
| 2003/0093364 A1 | 5/2003 | Bae et al. |
| 2003/0128690 A1 | 7/2003 | Elliott et al. |
| 2004/0137931 A1 | 7/2004 | Sarkar et al. |
| 2004/0193971 A1 | 9/2004 | Soong et al. |
| 2005/0030926 A1 | 2/2005 | Qian et al. |
| 2005/0128964 A1 | 6/2005 | Tiedemann et al. |
| 2005/0197150 A1 | 9/2005 | Sarkar et al. |

FOREIGN PATENT DOCUMENTS

| | | |
|---|---|---|
| WO | 01/26246 A1 | 4/2001 |
| WO | 2004098097 A1 | 11/2004 |

OTHER PUBLICATIONS

International Search Report for PCT/US03/17625 dated Nov. 13, 2003.
European Search Report in related European Application No. 08158312 dated Dec. 8, 2010, pp. 1-5.
European Search Report for EP 08158310 dated Feb. 8, 2010, pp. 1-2.
Office Action in related Chinese App. No. 03813219.2 dated Oct. 9, 2010, pp. 1-6.
Notification of 3rd OA in CN201110065764.5 dated Mar. 19, 2013, with English translation.
Examination Report in EP08158310.6 dated Feb. 15, 2013.
Notification of 2nd OA in CN20110065764.5 dated Oct. 31, 2012 with English translation.
Notification of 1st OA in CN201110065764.5 dated Feb. 13, 2012, with English translation.
First Examination Report for Indian Application No. 2748/CHENP/2004 dated Jul. 22, 2013.
"Physical Layer Standard for CDMA2000 Spread Spectrum Systems, Revision D," 3rd Generation Partnership Project 2, 3GPP2, 3GPP2 C.S0002-D, Ver. 1.0, Feb. 13, 2004, pp. 1-526.
Jul. 1, 2015—(EP) Communication Pursuant to Article 94(3) EPC—App 08158312.2.

* cited by examiner

APPARATUS AND AN ASSOCIATED METHOD FOR FACILITATING COMMUNICATIONS IN A RADIO COMMUNICATION SYSTEM THAT PROVIDES FOR DATA COMMUNICATIONS AT MULTIPLE DATA RATES

CROSS-REFERENCE TO RELATED APPLICATIONS

This application is a divisional of pending U.S. application Ser. No. 13/357,209 filed on Jan. 24, 2012, which is a continuation of patented U.S. application Ser. No. 12/646,465 filed on Dec. 23, 2009, issued as U.S. Pat. No. 8,130,695 on Mar. 6, 2012, which is a continuation of patented U.S. application Ser. No. 10/512,850 filed on Oct. 28, 2004, issued as U.S. Pat. No. 7,660,277 on Feb. 9, 2010, which is a national stage entry of International Application No. PCT/US03/17625, filed Jun. 5, 2003, which claims priority to provisional U.S. Application No. 60/386,819 filed on Jun. 7, 2002 and provisional U.S. Application No. 60/386,906 filed on Jun. 7, 2002, the entire disclosures of which are hereby incorporated by reference.

TECHNICAL FIELD

The present invention relates generally to a manner by which to facilitate communications in a radio communication system that provides for data communications at multiple data rates, such as a CDMA 2000 cellular communication system that provides for 1×EV-DV data communication services. More particularly, the present invention relates to apparatus, and an associated method, that provides a pilot, or other control, signal, of levels related to the data rates at which the data is communicated. When the data rate at which data is communicated is changed, the levels at which the pilot, or other control, signal is generated correspondingly changes.

Because the pilot, or other control, signal is of a level matched with the data rate at which data is communicated, the need otherwise to select a highest power level corresponding to a highest data rate, best to ensure successful communication of the data, is obviated. By permitting operation at reduced power levels, lessened amounts of power are consumed during communications, and improved system performance and capacity are permitted.

BACKGROUND OF THE INVENTION

Communication systems are endemic in modern society. Communication of data pursuant to many varied types of communication services is regularly needed. A communication system is used by which to effectuate the communication of the data. Due to advancements in communication technologies, new types of communication systems are being developed.

A communication system includes at least a first communication station and a second communication station interconnected by way of a communication channel. Data is communicated by the first communication station, referred to as a sending station, to the second communication station, referred to as a receiving station, by way of the communication channel. Data that is to be communicated by the sending station is converted, if needed, into a form to permit the data to be communicated upon the communication channel. And, the receiving station detects the data communicated upon the communication channel and recovers the informational content thereof.

A radio communication system is a type of communication system. In a radio communication system, a radio channel, defined upon a radio air interface, forms the communication channel interconnecting the sending and receiving stations. Conventional wireline communication systems, in contrast, require the use of fixed, wireline connections extending between the communications stations upon which to define the communication channel.

A radio communication system provides various advantages in contrast to a wireline counterpart. Initial installation and deployment costs associated with a radio communication system are generally less than the costs required to install and deploy a corresponding wireline communication system. And, a radio communication system can be implemented as a mobile communication system in which one or more of the communication stations operable therein is permitted mobility.

A cellular communication system is an exemplary type of mobile radio communication system. Cellular communication systems have been installed throughout significant portion of the populated areas of the world and have achieved wide levels of usage. A cellular radio communication system is a multi-user communication system in which radio communications are provided with a plurality of mobile stations. Telephonic communication of voice and data is effectuable by way of the mobile stations. Mobile stations are sometimes of sizes to permit their convenient carriage by users of the mobile stations.

A cellular radio communication system includes network infrastructure that is installed throughout the geographical area that is encompassed by the communication system. Mobile stations operable in the cellular communication system communicate, by way of radio channels, with base stations that form parts of the network infrastructure of the communication system.

Base stations are fixed-site radio transceiver that transceive data with the mobile stations. The base stations are installed at spaced-apart locations throughout the geographical area encompassed by the communication system. Each of the base stations defines a cell, formed of a portion of the geographical area. A cellular communication system is so-called because of the cells that together define the coverage area of the communication system.

When a mobile station is positioned within a cell defined by a base station, communications are generally effectuable with the base station that defines the cell. Due to the inherit mobility of a mobile station, the mobile station might travel between cells defined by different ones of the base stations. Continued communications with the mobile station is provided through communication hand off procedures between successive ones of the base stations defining the successive ones of the cells through which the mobile station passes. Through appropriate positioning of the base stations, the mobile station, wherever positioned within the area encompassed by the communication system, shall be within communication proximity of at least one base station.

Only relatively low-powered signals need to be generated to effectuate communications between a mobile station and a base station when the base stations are suitably positioned at selected spaced-apart locations. Hand-offs of communications between the successive base stations permit continued communications without necessitating increases in the power levels at which the communication signals are transmitted. And, because the signals that are generated are all generally of low powered levels, the same radio channels are able to be reused at different locations of the cellular communication system. The frequency spectrum allocated to a cellular communication system is thereby efficiently utilized.

A cellular communication system is constructed, generally, to be operable pursuant to an operating specification of a particular communication standard. Successive generations of communication standards have been developed, and operating specifications defining their operational parameters have been promulgated. First-generation and second-generation cellular communication systems have been deployed and have achieved significant levels of usage. Third-generation and successor-generation systems are undergoing development, standardization, and, at least with respect to the third-generation systems, partial deployment.

An exemplary third-generation cellular communication system is a system that operates pursuant to the operating protocol set forth in a CDMA 2000 operating specification. A CDMA 2000 cellular communication system, constructed in conformity with the CDMA 2000 operating specification, provides for packet-based data communication services.

Various technology proposals by which to effectuate communication of packet data at high data rates in a CDMA 2000 communication system have been proposed. By transmitting data at high data rates, increased amounts of data are able to be communicated in a given time period.

The 1×EV-DV data communication service is one such proposal. And, the 1×EV-DO data communication service is another such proposal. These data communication services provide for the communication of data at any of several selected data rates. And, systems providing for such communication services are sometimes referred to as being multi rate communication systems. Other communication systems that permit data to be communicated at any of two or more different data rates are also sometimes referred to as being multi rate, or multiple, data rate systems.

In the CDMA 2000 system that provides for multiple data rate communication services, data that is to be communicated is communicated at selected data rates on reverse links. That is to say, data that is communicated by a mobile station to a network portion of the communication system is communicated, upon a reverse link channel at a selected data rate. A pilot signal is also communicated by the mobile station to the network infrastructure along with the communication of the data. The pilot signal is communicated upon a reverse pilot channel, and the data is communicated upon a data channel. The pilot signal is used at the network infrastructure to assist in coherent demodulation of the data communicated upon the data channel.

In conventional CDMA 2000 systems, i.e., CDMA communication systems that do not provide for high data rate communications at multiple data rates that are quickly changeable, the pilot signal is of a constant, or slowly changing, signal-to-noise ratio (SNR) level (e.g., received pilot signal to noise ratio). However, when employed in a system that provides for multiple data rate communications, such as 1×EV-DV communication services, fast scheduling and rate control impact the power control operation of the communication system. Conventionally, the SNR level of the pilot signal must be set at a high SNR level to ensure successful communication of the data at a highest data rate of the multiple data rates. In the event that data is communicated at a data rate that is lower than the highest data rate, the pilot signal is of a SNR level that is greater than that which is needed. The pilot signal, during such times, therefore, is of an excessive power level. Communication performance in the communication system is adversely affected. And, when the mobile station is powered by a battery power supply, the battery power supply is depleted of stored energy at a rate greater than that which is required.

If a better manner could be provided by which better to match the power level of the pilot signal with the data rate at which the data associated therewith is communicated, improved system performance would be possible.

It is in light of this background information related to radio communication systems capable of communicating data at multiple data rates that the significant improvements of the present invention have evolved.

SUMMARY OF THE INVENTION

The present invention, accordingly, advantageously provides apparatus, and an associated method, by which to facilitate communications in a radio communication system that provides for data communications at multiple data rates.

Through operation of an embodiment of the present invention, a pilot, or other control, signal is provided that is of levels related to the data rates at which the data is communicated. When the data rate at which data is communicated is changed, the levels at which the pilot, or other control, signal is generated correspondingly changes.

That is to say, through operation of an embodiment of the present invention, the pilot, or other control, signal is of a level that is matched with the data rate at which the data is communicated. The need otherwise to select a highest power level corresponding to a highest data rate to ensure successful communication of the data is obviated. Operation is permitted, thereby, at reduced power levels. And, lessened amounts of power are consumed during communication operations, and improved system performance and increased system capacity are permitted.

When implemented in a CDMA 2000, cellular communication system that provides for multiple data rates of data communications, such as the date rates available in an 1×EV-DV communication service, extra pilot power on the reverse link is provided. The existing operating specification defines, on the reverse link, extending from a mobile station to the network infrastructure of the communication system, both a reverse fundamental channel and a reverse supplemental channel. The reverse supplemental channel is provided in significant part, for the communication of data pursuant to a 1×EV-DV communication service.

A reverse pilot channel is also defined. The pilot signal is sent by the mobile station on the reverse pilot channel along with data on the reverse fundamental channel.

Pursuant to operation of an embodiment of the present invention, a reverse supplemental pilot channel is also defined. And, the mobile station additionally, selectably, sends a supplemental pilot signal thereon. The data communicated upon the reverse fundamental channel is, for instance, of constant, or varying among a set of predefined low, data rates. The pilot signal sent on the reverse pilot channel is selected to be of a level, preferably the smallest possible level, to permit coherent demodulation of the data communicated upon the reverse fundamental channel. The pilot signal on the reverse supplemental pilot channel is of a power level selected responsive to the data rate at which the data is sent upon the reverse supplemental channel. When the data rate of the data communicated upon the reverse supplemental channel is high, the power level of the supplemental pilot signal sent on the reverse supplemental pilot channel is correspondingly high. And, when the data rate of the data communicated upon the supplemental channel is low, the power level at which the reverse supplemental pilot signal is sent is correspondingly low. By reducing the power level of the supplemental pilot signal when the data rate of the associated data is low, the power levels of the pilot signals are matched with the data rates of the data that is communicated. And, thereby, transmission of the pilot signals at power levels exceeding those that are needed coherently to demodulate the data communicated upon the reverse fundamental and supplemental channels does not occur. Battery power consumption at the mobile station is not unnecessarily consumed, and signal energy on the radio air interface extending between the mobile station and the network infrastructure is not unnecessarily high.

In one implementation, the pilot power level of the pilot signal sent on the reverse pilot channel is always of a level needed for the operation of the reverse fundamental channel. That is to say, the T/P ratio of the reverse fundamental channel is independent of the rate in the reverse supplemental channel. That extra pilot power needed for operation of the reverse supplemental channel is provided by the supplemental pilot signal sent upon the reverse supplemental pilot channel. Fast power control is performed at the network infrastructure, responsive to either the pilot signal sent upon the reverse pilot channel alone, or responsive to the pilot signals communicated upon both of the reverse pilot channel and the reverse supplemental pilot channel.

In another implementation, the mobile station always sets the power level of the pilot signal sent upon the reverse pilot channel. Thereby, the T/P ratio of the data sent upon the reverse fundamental channel is set according to the reverse supplemental channel data rate of a prior frame of data, i.e., data sent during a preceding time period. As the network infrastructure is aware of the data rate of the data communicated during a prior time period, the network infrastructure is also aware of the current T/P ratio upon the reverse fundamental channel. And, the network infrastructure adjusts the outer loop power control set point responsive thereto. If the reverse supplemental channel requires additional pilot power, in addition to the pilot power provided upon the reverse pilot channel, then the reverse supplemental pilot signal sent upon the reverse supplemental channel is used to provide, and obtain, the additional power that is needed.

Pursuant to an additional embodiment of the present invention, a manner is provided by which to facilitate stabling power control in the event of a data rate change of communication of data during operation of the communication system. In one implementation, the adjustment of the pilot reference level is delayed. In another implementation, conservative power level setting during rate and power control transition is provided. And, in another implementation, fast rate indications are provided.

In these and other aspects, therefore, apparatus, and an associated method, is provided for a radio communication system. The radio communication system provides for the communication of data by a first communication station on at least a first data channel, at least at a first selected data rate. A first control signal is communicated upon a first control channel in which the first control signal is targeted at a first trigger level during at least a first selected time period. Communication of the data on the at least the first data channel is facilitated. A second control signal generator selectably generates a second control signal for communication upon a second control channel. The second control signal is targeted at a second target level. The second target level is selected responsive to the at least the first selected data rate at which the data is communicated on the at least the first data channel.

A more complete appreciation of the present invention and the scope thereof can be obtained from the accompanying drawings, which are briefly summarized below, the following detailed description of the presently-preferred embodiments of the invention, and the appended claims.

DETAILED DESCRIPTION

Figure 1:
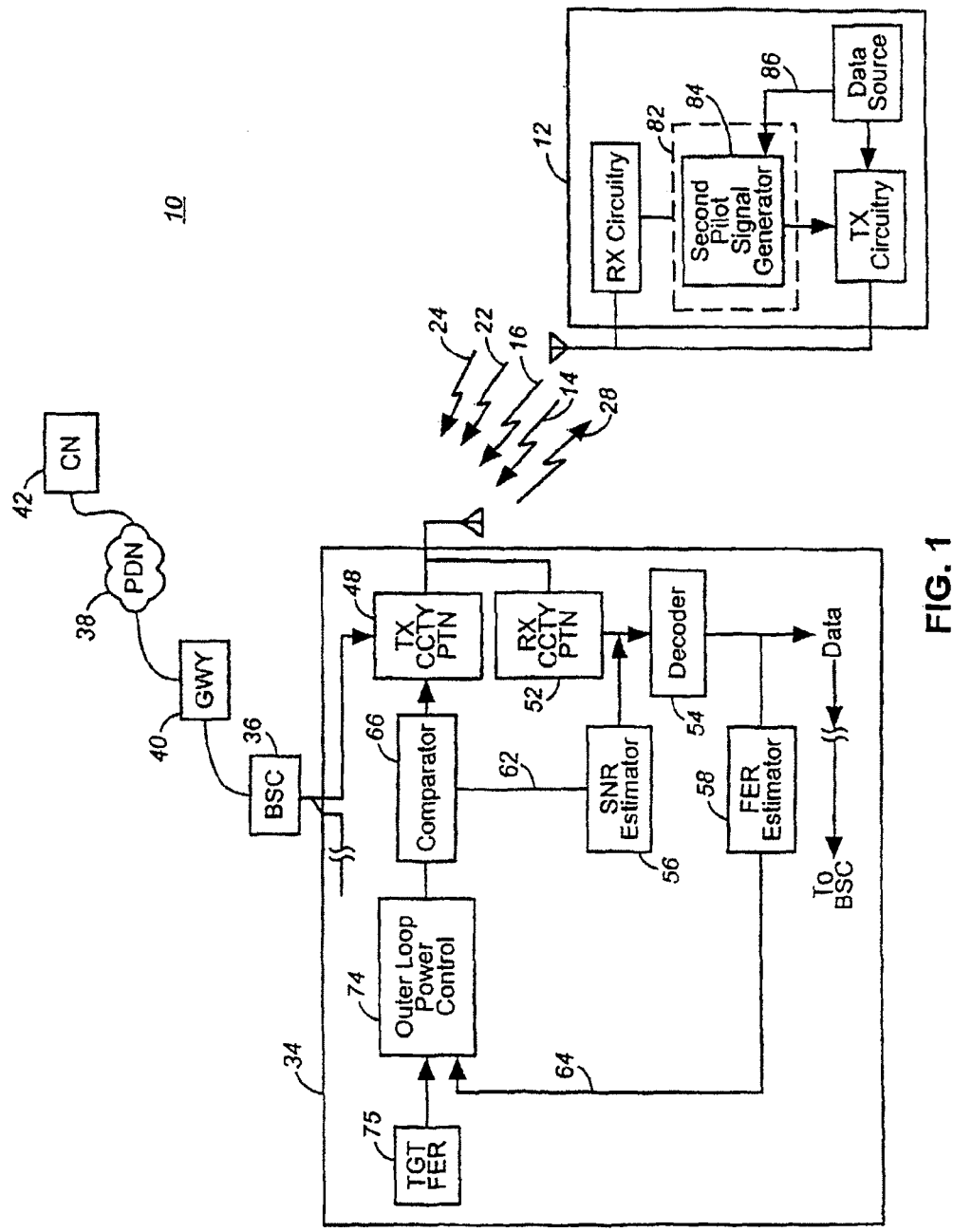
FIG. 1 illustrates a functional block diagram of a radio communication system operable pursuant to an embodiment of the present invention.

Referring first to FIG. 1, a radio communication system, shown generally at 10, provides for radio communications, in a multi-user environment, with mobile stations, of which the mobile station 12 is representative. The communication system forms a multiple data rate communication system in which data is communicated, selectably at a selected data rate of a plurality of separate, allowable data rates. In the exemplary implementation, the communication system forms a CDMA 2000 cellular communication system that provides for 1×EV-DV communication services. That is to say, in the exemplary implementation, the communication system is compliant, generally, with the operating protocols set forth in the CDMA 2000/1×EV-DV operating specification.

The teachings of the present invention, are, however, amenable for use in other types of multi rate data communication systems. While the following description of operation of various embodiments of the present invention shall be described with respect to their implementation in a CDMA 2000 cellular communication system that provides for 1×EV-DV data communications, the teachings of the present invention are analogously applicable to other types of communication systems.

Two-way communication of data between a mobile station and a network part of the communication system is provided. A radio air interface is defined between the network part of the communication system and mobile stations operable therein. Forward link channels are defined upon forward links extending from the network part to the mobile stations. And, reverse link channels are defined upon reverse links extending from the mobile stations to the network part of the communication system. Both control information and data traffic is communicated between the network part and the mobile stations upon the forward and reverse link channels.

The operating specification pursuant to which the communication system is constructed to be in compliance defines various control and data channels upon the forward and reverse links. Of significance to an embodiment of the present invention, in the exemplary implementation, a reverse fundamental channel (R-FCH) and a reverse supplemental channel (R-SCH) are defined upon which to communicate, from a mobile station to the network part, traffic data, communicated pursuant to effectuation of a data communication service. The arrow 14 represents the reverse fundamental channel upon which data is communicated by the mobile station 12 to the network part of the communication system, and the arrow 16 is representative of a reverse supplemental channel upon which traffic data is also communicated by the mobile station to the network part. More particularly, the reverse supplemental channel is generally utilized upon which to communicate 1×EV-DV data at any of various selected data rates. The data rates at which the data is communicated upon the reverse supplemental channel is susceptible to abrupt changes.

Various control channels are also defined on the reverse link. Included amongst the control channels is a reverse pilot channel (R-PICH), represented by the arrow 22. Pursuant to an embodiment of the present invention, an additional channel, a reverse supplemental pilot channel (R-SPICH) is defined. The reverse supplemental pilot channel is represented in the Figure by the arrow 22. And, forward link channels, both traffic and control channels, are represented in the Figure by the arrow 28.

The network infrastructure of the communication system is here shown to include a base station 34. The base station includes transceiver circuitry for transceiving data upon the forward and reverse link channels defined upon the radio air interface extending between the network part and the mobile stations of the communication system. In the exemplary implementation, the base station operates pursuant to a CDMA (code-division, multiple-access) communication scheme. The base station further includes circuitry and elements to perform various functions, such as power control functions that power control of signals generated during operation of the communication system.

The base station 34 forms a portion of a radio access network portion of the network part of the communication system. The radio access network also includes a base station controller (BSC) 36 to which the base station 34 is coupled. The base station controller operates, amongst other things to control operation of the base station 34, as well as other base stations to which the base station controller is coupled. The radio access network is here shown to be coupled to a packet data network (PDN) 38, here by way of a gateway (GWY) 40. A correspondent node (CN) 42 is coupled to the packet data network. The correspondent node is representative of a communication node that forms an ultimate source, or ultimate destination, of data communicated with the mobile station 12. A computer station, a telephonic station, and a content server are all exemplary of devices of which the correspondent node can be comprised.

Various elements of the base station 34 are also represented in FIG. 1. Here, the front end transmit and front end receive circuit portions 48 and 52, respectively, are shown. The front end transmit and receive portions perform functions such as up-conversion and down-conversion, respectively, operations upon data that is communicated upon the radio air interface. The front end receive circuitry portion is coupled to a decoder and to a signal-to-noise ratio (SNR) estimator 56. And, the decoder is coupled to a frame error rate (FER) estimator 58. The estimators 56 and 58 operate upon indications of data received by the front end receive circuitry to generate estimates of signal to noise ratios and frame error rates of the indications provided thereto. Values representative of the estimate generated by the estimator 56 on the line 62 are provided to a comparator 66. And, values representative of the estimates generated by the estimator 58 on the line 67 are provided to an outer loop power control element 74. The elements 66 and 74 form portions of the transmit chain of the base station. A value of a target frame error rate (TG FER) 75 is also provided to the outer loop power control element 74. The outer loop power control element forms a value that is applied to the comparator 66, and a comparator output is provided to the front transmit circuitry 48. Power control is effectuated through the communication of, inter alia., power control commands that instruct the mobile station as to at what power levels at which to communicate data on the reverse data channel (R-FCH).

As mentioned previously, pilot signals are communicated by the mobile station to facilitate coherent demodulation of the data communicated upon the reverse data channels. The pilot signal is of an adequate power level to permit the informational content of the data communicated by the mobile station to the network infrastructure adequately to be recovered. Because of the direct relationship between the power level at which the pilot signal must be sent and the data rate at which the traffic data is sent, and its effect upon power control, conventionally the power level at which the pilot signal is sent is set to be of a power level corresponding to the power level required of the pilot signal associated with data communicated at a highest possible data rate. When data is communicated at a data rate less than the highest possible data rate, the power level of the pilot signal is unnecessary.

An embodiment of the present invention comprises apparatus, shown generally at 82, embodied at mobile stations, such as the mobile station 12. The apparatus includes a second pilot, or other control, signal generator 84. The signal generator generates a pilot signal of a power level responsive to the data rate at which data is communicated by the mobile station upon the reverse supplemental channel. In one implementation, the pilot signal is unmodulated. In other implementations, the pilot signal is modulated by a known sequence, by a pseudodeterminative sequence, or by other values. The indication of the data rate at which the data is communicated by the mobile station upon reverse supplemental channel is provided to the second pilot signal generator by way of the line 86. The indication is here represented to be provided by a data source that forms part of the transmit chain, together with the transmit circuitry of the mobile station. And, the signal formed, or caused to be formed, by the second control signal generator is communicated by the transmit circuitry of the mobile station. As the data rate changes, the power level of the additional pilot signal formed by the signal generator 84 correspondingly changes, thereby matching the power level of the signal with the data rate of the traffic data that is communicated.

Figure 2:
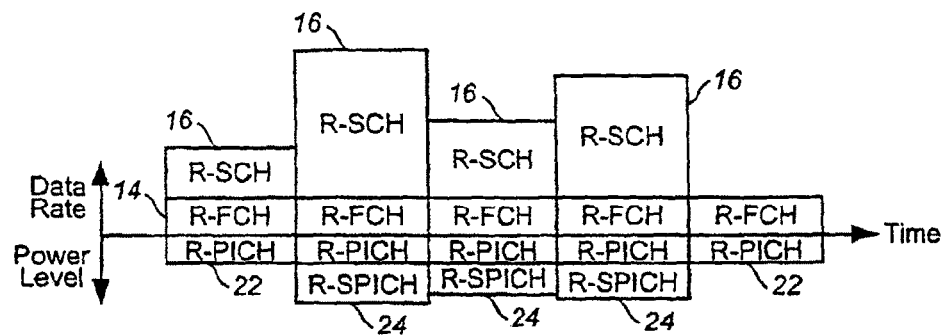
FIG. 2 illustrates a representation of the relationship between the data rates of data communicated upon reverse fundamental and supplemental channels and the power levels of pilot signals sent on reverse pilot and reverse supplemental pilot channels during operation of an embodiment of the present invention.

FIG. 2 illustrates a representation of exemplary data rates of data communicated upon the reverse fundamental channel 14 and the reverse supplemental channel 16 during successive time frames or other time periods. And, corresponding power levels at which pilot signals are sent upon the reverse pilot channel 22 and reverse supplemental pilot channel 24 pursuant to operation of an embodiment of the present invention are also represented. In this implementation, the power level of the pilot signal sent by the mobile station upon the reverse pilot channel 24 is of a pilot power level needed for operation of the reverse fundamental channel. That is to say, the T/P ratio of the reverse fundamental channel is independent of the rate of the reverse supplemental channel. The additional pilot power that is needed for operation of the reverse supplemental channel 16 is provided by the supplemental pilot signal sent on the reverse supplemental pilot channel 24. When detected at the base station, fast power control is performed based upon pilot signals sent on the reverse pilot channel only, or upon both the reverse pilot channel and the supplemental pilot signal sent upon the reverse supplemental pilot channel.

In the event of variable rate operation, i.e., when the data rate at which the data is communicated on the supplemental channel changes, the pilot signal sent upon the reverse pilot channel is transmitted at a lowest possible power level that can ensure the performance of the communication of the data on the reverse fundamental channel. The power level of the supplemental pilot signal sent upon the reverse supplemental channel is set to be:

$$P = (10^{pilot\_reference\_level*0.125/10} - 1.0) * R\text{-PICH}.$$

If the T/P ratio of the reverse supplemental channel is defined to be the ratio of the power of the reverse supplemental channel to the power of the combination of the reverse pilot channel and the reverse supplemental pilot channel, then the T/P ratio of the reverse supplemental channel is set to a value of a nominal attribute gain of the rate that is currently used. Power is not wasted. And, as the T/P ratio of the reverse fundamental channel is independent of the rate of the reverse supplemental channel, the power control loop is not disturbed by the data rate change in the reverse supplemental channel.

Figure 3:
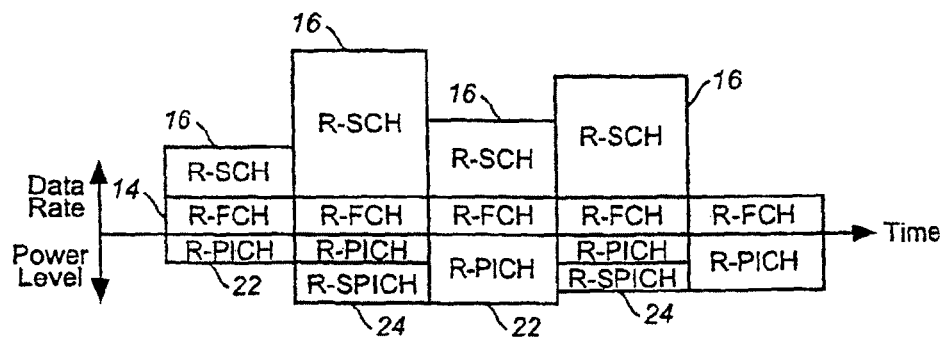
FIG. 3 illustrates a representation, similar to that shown in FIG. 2, also representative of the relationship between data rates at which data is communicated on reverse link channels and power levels of pilot signals generated on reverse pilot and supplemental pilot channels, here, pursuant to operation of another embodiment of the present invention.

FIG. 3 illustrates again the relationships between the data rates of the data communicated upon the reverse fundamental and supplemental channels 14 and 16 and the power levels of the pilot signals upon reverse pilot channel and reverse supplemental pilot channel 22 and 24 during successive time frames. In this implementation, the power level of the pilot signal sent by the mobile station sent on the reverse pilot channel is set by the mobile station. And, hence, the T/P ratio of the reverse fundamental channel, all according to the data rate of the data communicated upon the reverse supplemental channel in a previous frame. As the base station knows also the data rate of the data communicated upon the reverse supplemental channel during the prior time frame, the base station also knows of the current T/P ratio of the data communicated upon the reverse fundamental channel and adjusts the outer loop power control set point accordingly. If the current reverse supplemental channel requires additional pilot power than provided on the reverse pilot channel during the current time frame, the reverse supplemental pilot channel is used to communicate a supplemental pilot signal to provide the extra power.

In this implementation, the power control loop is not independent of the data rate change of the reverse supplemental channel. But, the power control loop is relatively undisturbed by the rate change in that the base station is aware of how to adjust the outer loop power control set point at each frame boundary. In this scheme, an improved SNR estimate is provided for use upon inner loop power control as the pilot signal sent on the reverse pilot channel is generally of a relatively high power. Hence, the power control made possible in this implementation is fairly accurate.

Figure 4:
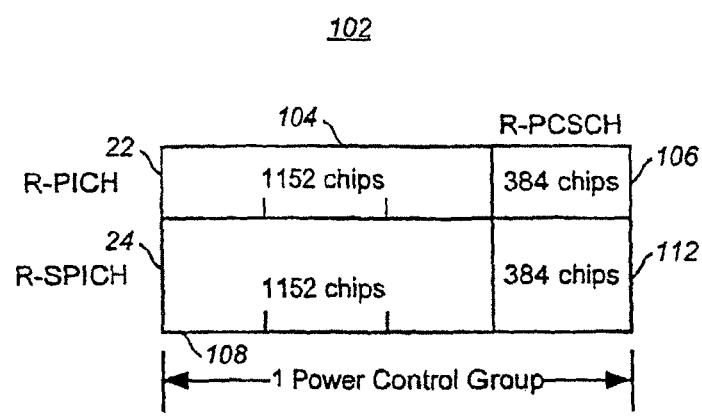
FIG. 4 illustrates a representation of an exemplary power control subchannel structure of the reverse pilot and supplemental pilot channels defined pursuant to an embodiment of the present invention.

FIG. 4 illustrates a representation, shown generally at 102, of exemplary power control subchannel structures of the reverse pilot channel 22 and the reverse supplemental pilot channel 24. As illustrated, the reverse pilot channel is formed of a first portion 104 of a length of 1152 chips and a 384 chip-length reverse power control subchannel 106. Similarly, the reverse supplemental pilot channel 24 is also formatted to include a first portion 108 of a 1152 chip length and a 384 chip length portion 112 forming the reverse pilot control subchannel values. A code, for example, $W_{32}^{64}$ can be assigned to the reverse supplemental pilot channel. Backward compatibility is preserved through use of this type of structure.

Figure 5:
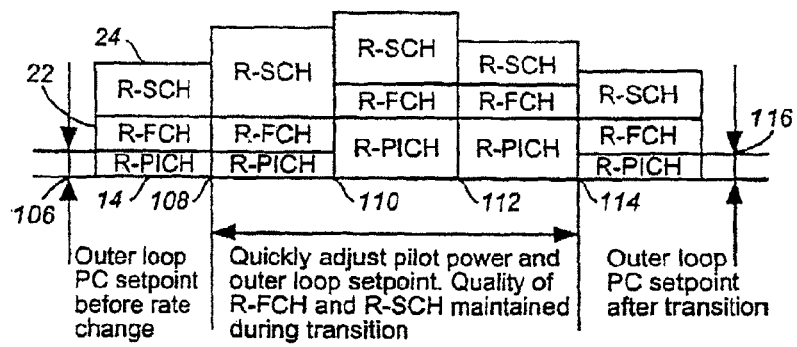
FIG. 5 illustrates a representation, similar to those shown in FIGS. 2-3, here showing the relationship between the data rates at which data is communicated upon the reverse supplemental channel and the power level of a pilot signal generated upon a reverse pilot channel pursuant to operation of an embodiment of the present invention.

FIG. 5 illustrates a representation of the relationship between the data rates at which communication data is communicated upon the reverse fundamental and supplemental channels 14 and 16 and the power level of the pilot signal sent upon the reverse pilot channel. In this implementation, the reference level of the pilot signal is delayed following a data rate change of the communication data, communicated upon the data channels. At time 106, the outer loop power control set point is as indicated by the opposing arrows. This is the power control set point prior to a rate change of data communicated upon the reverse supplemental channel. At time 108, the data rate of the data communicated upon the reverse supplemental channel increases. Time 110 defines the start of a subsequent time frame. And, thereafter, during a subsequent time frame, the pilot power and outer loop set point is adjusted. During this subsequent time period, the quality of the reverse fundamental channel and the reverse supplemental channel is maintained. At time 112, the data rate of the data communicated upon the reverse supplemental channel again changes. And, subsequent to time 114, the pilot power is again adjusted. And, as indicated at the time 116, the outer loop set point is again indicated by the opposing arrows.

During the first frame following the data rate change at the time 108, a sequence of procedures is performed at the mobile station. The T/P ratio of the reverse fundamental channel is maintained. And, the T/P ratio of the reverse supplemental channel is adjusted according to the nominal attribute gain of the new data rate plus the difference between the pilot reference level and the new data rate and the old data rate. During this frame, the power level of the reverse supplemental channel is set according to the new rate, but the target received SNR of the reverse pilot channel and reverse fundamental channel are maintained at the same level as in the prior frame. And, at the base station, as the base station is unaware of the rate change of the data communicated upon the reverse supplemental channel, the base station power control actions continue as is no rate change has occurred.

During the second time frames, commencing at the time 110, following the data rate change, the mobile station adjusts the power level of the pilot signal by the difference between the pilot reference level of the new data rate and the old data rate. Additionally, the T/P ratio of the reverse supplemental channel is adjusted according to the nominal attribute gain of the new data rate. And, the T/P ratio of the reverse fundamental channel is adjusted according to the multiple channel gain of the new data rate. At the base station, the rate indicator in the first frame following the data rate change is received. The base station thereby has knowledge of the new data rate. And, the base station adjusts the outer loop power control threshold to the initial target outer loop power control threshold of the new data rate.

Figure 6:
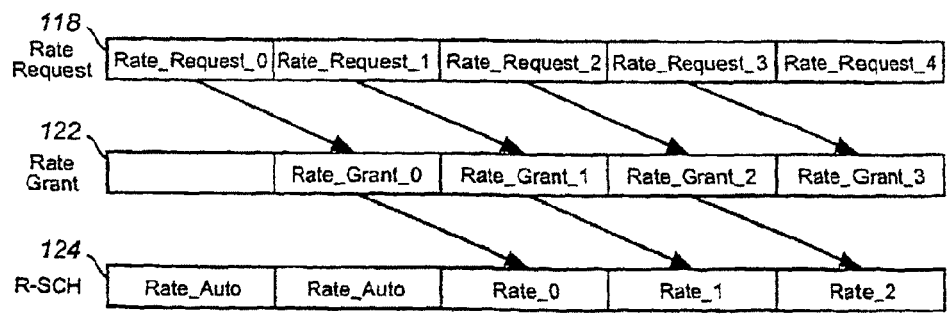
FIG. 6 illustrates a timing diagram representing the timing relationship of rate request and grant scheduling pursuant to operation of an embodiment of the present invention.

FIG. 6 illustrates rate requests 118, rate grants 122, and reverse supplemental channel values 124 during operation of an embodiment of the present invention. In this implementation, data rate changes and power level adjustments, and adjustments to the T/P ratios are made according to the nominal attribute gain and multiple channel adjustment gains, all as specified in the operating specification of CDMA 2000. Without the knowledge of the current rate, the base station assumes the mobile station to transmit at a highest rate allowed by the previous rate grant. And, the outer loop power control threshold is set accordingly.

In the exemplary operations set forth in FIG. 6, the rate of the data communicated upon the reverse supplemental channel is always equal to or less than, the data rate that is granted by the base station. That is to say, Rate_I is less than or equal to Rate_grant_I. Because the base station does not know the data rate of the data communicated upon the reverse supplemental channel until the rate indicator is received correctly, the base station assumes the current rate, Rate_I equals the Rate_grant_i. And, the outer loop power control threshold is set accordingly. Through this operation, there is always enough power in the pilot signal sent on the reverse pilot channel to guarantee the required frame error rate on the reverse supplemental channel.

Figure 7:
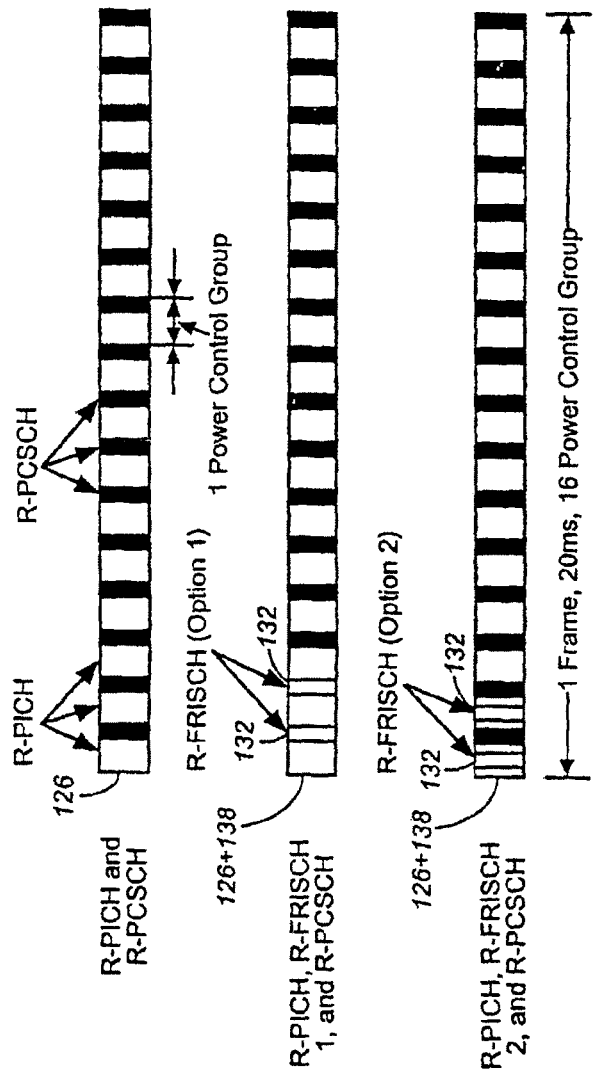
FIG. 7 illustrates a representation of the generation of rate indications on a reverse pilot channel generated pursuant to operation of an embodiment of the present invention.

FIG. 7 illustrates an implementation in which a fast rate indication is multiplexed into the reverse pilot channel, thereby to provide the base station with an indication of the data rate change at the earliest possible time. The first sequence 126, illustrates the reverse pilot channel and the reverse power control subchannel during successive time periods within a time frame, each defining a power control group 128.

The second sequence illustrates the reverse pilot and reverse pilot channel and reverse power control subchannel together with a reverse fast rate indication subchannel (R-FRISCH) 132 defined pursuant to an embodiment of the present invention. And, the third sequence illustrates the reverse pilot channel, the reverse fast rate indication subchannel and reverse power control subchannel defined pursuant to operation of another embodiment of the present invention.

As the Figure illustrates, selected power control bits, such as the first one or two power control bits of the reverse link power control subchannel are punctured with values that define the reverse fast rate indication subchannel. In one implementation, a pilot signal generator, such as the pilot signal generator 84 shown in FIG. 1 also operates as a rate indication generator that generates rate indications that indicate the data rate that is inserted into the illustrated positions. In another implementation, the values are inserted even earlier. Alternately, the mobile station can also puncture a portion of the reverse pilot channel in the first and second power control group. The rate indication bits inserted into these positions form this subchannel, the R-FRISCH. The mobile station changes data rates and adjusts the power levels and T/P ratios according to the nominal attribute gain and multiple channel adjustment gain, all as specified in the operating specification of the CDMA 2000 system. The base station holds the outer loop power control thresholds in the first one or two power control groups of this frame, and adjusts the outer loop power control threshold thereafter according to the rate change information conveyed in the reverse fast rate indication subchannel. Fast rate indication can alternately be realized in other manners, such as by multiplexing the values together with the reverse rate indicator channel (R-RICH). The definition and use of the R-FRISCH permits a base station to adjust the outer loop power control threshold quickly. The bits can also be used together with the R-RICH to decode the detail rate indication information in a finer resolution.

Through operation of any of these embodiments of the present invention, fast stabling of the power control loop is provided with minimal change to the existing operating specification.

The preferred descriptions are of preferred examples for implementing the invention, and the scope of the invention should not necessarily be limited by this description. The scope of the present invention is defined by the following claims.

We claim:

1. A method comprising:
   receiving a pilot signal on a reverse pilot channel and a supplemental pilot signal on a reverse supplemental pilot channel;
   receiving data on a reverse data channel, wherein a power level of the received supplemental pilot signal varies based on variations in a data rate on the reverse data channel; and
   demodulating the reverse data channel in a coherent manner based on the pilot signal and the supplemental pilot signal.

2. The method of claim 1, further comprising performing outer loop power control based upon the reverse pilot channel and the reverse supplemental pilot channel.

3. The method of claim 2, wherein the reverse pilot channel and the reverse supplemental pilot channel each include a reverse power control subchannel.

4. The method of claim 3, wherein the reverse power control subchannel in the reverse pilot channel includes a reverse fast rate indicator providing an indication of the data rate on the reverse data channel, wherein the performing of outer loop power control is based on the reverse fast rate indicator.

5. The method of claim 4, further comprising:
   during a first time frame, maintaining outer loop power control thresholds; and
   during a second time frame following the first time frame, adjusting the outer loop power control thresholds based on the indication of the data rate on the reverse data channel provided in the reverse fast rate indicator.

6. The method of claim 5, wherein the variations in the data rate occurred during the first time frame.

7. The method of claim 1, further comprising:
   performing outer loop power control based upon a traffic-to-pilot ratio of the reverse data channel.

8. The method of claim 1, wherein the power level of the received supplemental pilot signal is generated in response to the data rate on the reverse data channel exceeding a predetermined target level data rate.

9. The method of claim 8, wherein the pilot signal has a constant power level.

10. An apparatus comprising:
    a receiver circuit configured to receive a reverse pilot channel including a pilot signal, a reverse supplemental pilot channel including a supplemental pilot signal, and data on a reverse data channel including modulated data, wherein a power level of the supplemental pilot signal is adjusted based on variations in a data rate on the reverse data channel; and
    a demodulator configured to demodulate the data on the reverse data channel in a coherent manner based on the pilot signal and the supplemental pilot signal.

11. The apparatus of claim 10, further comprising power control circuitry configured to perform outer loop power control based upon the reverse pilot channel and the reverse supplemental pilot channel.

12. The apparatus of claim 11, wherein the reverse pilot channel and the reverse supplemental pilot channel each include a reverse power control subchannel.

13. The apparatus of claim 12, wherein the reverse power control subchannel in the reverse pilot channel includes a reverse fast rate indicator providing an indication of the data rate on the reverse data channel, wherein the power control circuitry is configured to perform the outer loop power control based on the reverse fast rate indicator.

14. The apparatus of claim 13, wherein the power control circuity is configured to, during a first time frame, maintain outer loop power control thresholds and, during a second time frame following the first time frame, adjust the outer loop power control thresholds based on the indication of the data rate on the reverse data channel provided in the reverse fast rate indicator.

15. The apparatus of claim 14, wherein the variations in the data rate occurred during the first time frame.

16. The apparatus of claim 10, further comprising power control circuitry configured to perform outer loop power control based upon a traffic-to-pilot ratio of the reverse data channel.

17. The apparatus of claim 10, wherein the power level of the supplemental pilot signal is generated in response to the data rate on the reverse data channel exceeding a predetermined target level data rate.

18. The apparatus of claim 17, wherein the pilot signal has a constant power level.

* * * * *